(12) United States Patent
Racz et al.

(10) Patent No.: US 11,423,161 B1
(45) Date of Patent: Aug. 23, 2022

(54) SYSTEM AND MEDIA RECORDING DEVICE WITH SECURED ENCRYPTION

(71) Applicant: GENETEC INC., St-Laurent (CA)

(72) Inventors: Pierre Racz, Montreal (CA); Frédéric Rioux, Montreal (CA)

(*) Notice: Subject to any disclaimer, the term of this patent is extended or adjusted under 35 U.S.C. 154(b) by 128 days.

(21) Appl. No.: 16/422,523

(22) Filed: May 24, 2019

Related U.S. Application Data

(60) Provisional application No. 62/676,970, filed on May 26, 2018, provisional application No. 62/676,967, filed on May 26, 2018.

(51) Int. Cl.

| G06F 21/62 | (2013.01) |
|---|---|
| G06F 21/60 | (2013.01) |
| G06Q 50/18 | (2012.01) |
| G06Q 50/26 | (2012.01) |
| H04L 9/40 | (2022.01) |
| H04L 9/08 | (2006.01) |
| H04L 9/14 | (2006.01) |
| H04L 9/06 | (2006.01) |
| H04W 12/033 | (2021.01) |

(Continued)

(52) U.S. Cl.
CPC .......... *G06F 21/62* (2013.01); *G06F 21/602* (2013.01); *G06Q 50/18* (2013.01); *G06Q 50/26* (2013.01); *H04L 9/0631* (2013.01); *H04L 9/0825* (2013.01); *H04L 9/0869* (2013.01); *H04L 9/14* (2013.01); *H04L 63/102* (2013.01); *H04W 12/033* (2021.01); *G06Q 2220/10* (2013.01); *H04L 2209/80* (2013.01); *H04N 7/185* (2013.01)

(58) Field of Classification Search
None
See application file for complete search history.

(56) References Cited

U.S. PATENT DOCUMENTS

| 5,757,909 A | 5/1998 | Park |
|---|---|---|
| 6,052,466 A | 4/2000 | Wright |

(Continued)

FOREIGN PATENT DOCUMENTS

| CA | 2354351 A1 | 3/2002 |
|---|---|---|
| JP | 2007-041756 A | 2/2007 |

(Continued)

OTHER PUBLICATIONS

Implementation of the Image Logging Server for Web Forensics. Yoo. IEEE. (Year: 2008).*

(Continued)

*Primary Examiner* — Venkat Perungavoor
(74) *Attorney, Agent, or Firm* — Anglehart et al.

(57) ABSTRACT

In one aspect the present invention disclose system for recording and handling media for use as evidence in legal proceeding. In one other aspect the present invention discloses a device for recording media for use as evidence in legal proceedings. In another aspect the present disclosure provides a server also referred to herein as an evidence vault or vault for handling media from a media recording device for use as evidence in legal proceedings. The all three aspects the invention benefit from a double layer symmetrical and asymmetrical encryption method to protect the media recordings of the device, the server and the system as a whole as well as the transmission of media between different components.

21 Claims, 13 Drawing Sheets

(51) Int. Cl.
*G06F 21/64* (2013.01)
*H04N 7/18* (2006.01)

(56) References Cited

U.S. PATENT DOCUMENTS

| | | | | |
|---|---|---|---|---|
| 6,460,138 | B1* | 10/2002 | Morris | G06Q 20/341 |
| | | | | 713/168 |
| 7,242,772 | B1 | 7/2007 | Tehranchi | |
| 8,332,527 | B2 | 11/2012 | Yan et al. | |
| 8,712,045 | B2 | 4/2014 | Dubhashi et al. | |
| 8,891,773 | B2 | 11/2014 | Henze et al. | |
| 2004/0005061 | A1 | 1/2004 | Buer et al. | |
| 2006/0242423 | A1* | 10/2006 | Kussmaul | H04L 9/3231 |
| | | | | 713/182 |
| 2006/0259433 | A1 | 11/2006 | Lahtinen et al. | |
| 2014/0195651 | A1 | 7/2014 | Stockhammer et al. | |
| 2014/0334381 | A1 | 11/2014 | Subramaniam et al. | |
| 2015/0304315 | A1* | 10/2015 | Estehghari | H04L 9/0825 |
| | | | | 713/156 |
| 2016/0062762 | A1* | 3/2016 | Chen | G06F 8/654 |
| | | | | 711/103 |
| 2016/0064036 | A1* | 3/2016 | Chen | G06F 12/1408 |
| | | | | 386/241 |
| 2016/0066085 | A1* | 3/2016 | Chang | G06F 21/79 |
| | | | | 381/122 |
| 2016/0182850 | A1 | 6/2016 | Thompson | |
| 2016/0358397 | A1* | 12/2016 | Kristensen | G07C 9/00309 |
| 2017/0200476 | A1* | 7/2017 | Chen | G06Q 10/10 |
| 2017/0293766 | A1* | 10/2017 | Schnjakin | G06F 21/335 |
| 2018/0012032 | A1* | 1/2018 | Radich | H04L 9/30 |

FOREIGN PATENT DOCUMENTS

| | | | |
|---|---|---|---|
| WO | WO 2017/083980 | A1 | 5/2017 |
| WO | WO 2017/083985 | A1 | 5/2017 |

OTHER PUBLICATIONS

Evidentiary Effect on Electronic Records—Legal Issues on Wiretapping of the Skype Phone. Cheng. IEEE. (Year: 2007).*
Towards a Lawfully Secure and Privacy Preserving Video Surveillance System. Castiglione. Springer-Verlag. (Year: 2010).*
User Authentication Protocol for Blocking Malicious User in Network CCTV Environment. Park. IEEE> (Year: 2010).*
An efficient key management solution for privacy masking, restoring and user authentication for video surveillance servers. Lee. Elsevier. (Year: 2016).*
A Light-Weight Real-Time Privacy Protection Scheme for Video Surveillance by Unmmaned Aircraft Systems. Shrestha. (Year: 2014).*
Security and Privacy for Body Cameras Used in Law Enforcement. Wang. IEEE. (Year: 2015).*
Encryption-based Privacy Protection for Police Body-worn Cameras. Martinez. IEEE. (Year: 2016).*
AV Encryption Algorithm to Protect Audio visual Content for IPTV. Akram. (Year: 2016).*
International application No. PCT/CA2016/051350 International Preliminary Report on Patentability Chapter I dated May 22, 2018.
International application No. PCT/CA2016/051350 International Search Report dated Jan. 23, 2017.
International application No. PCT/CA2016/051350 Search Strategy dated Jan. 23, 2017.
International application No. PCT/CA2016/051350 Written Opinion of the International Searching Authority dated Jan. 23, 2017.
European application No. 16865359.0 office action dated Feb. 25, 2020.
European application No. 16865359.0 European search report and search opinion dated May 24, 2019.
Japanese Patent Application No. 2018-526721 Office Action dated Nov. 4, 2020 and its English translation included.
International application No. PCT/CA2016/051358 International Preliminary Report on Patentability Chapter I dated May 22, 2018.
International application No. PCT/CA2016/051358 International Search Report dated Mar. 28, 2017.
International application No. PCT/CA2016/051358 Search Strategy dated Mar. 28, 2017.
International application No. PCT/CA2016/051358 Written Opinion of the International Searching Authority dated Mar. 28, 2017.
Indian application No. 201817022859 Office Action dated Feb. 1, 2021.
U.S. Appl. No. 15/776,448 Office Action dated Jul. 24, 2020.
"Chapter 1: Overview of Cryptography ED—Menezes A J; Van Oorschot PC; Vanstone S A", Handbook of Applied Cryptography; [CRC Press Series on Discrete Mathematices and Its Applications], CRC Press, Boca Raton, FL, US, pp. 1-48, Oct. 1, 1996 (Oct. 1, 1996), XP001525001, ISBN: 978-0-8493-8523-0. Retrieved from the Internet:URL:http://www.cacr.math.uwaterloo.ca/hac/.
Feng-Cheng Chang et al: "Layered Access Control Schemes on Watermarked Scalable Media", The Journal of VLSI Signal Processing, Kluwer Academic Publishers, BO, vol. 49, No. 3, Jun. 28, 2007 (Jun. 28, 2007). pp. 443-455, XP019557804, ISSN: 1573-109X, DOI: 10.1007/S11265-007-0095-0.
Honggeun Kim et al: "An efficient implementation of RC4 cipher for encrypting multimedia files on mobile devices", Applied Computing 2007. The 22nd Annual ACM Symposium on Applied Computing—Mar. 11-15, 2007—Seol, South Korea, ACM—New York, NY, US. Mar. 11, 2007 (Mar. 11, 2007), pp. 1171-1175, XP058223667, DOI: 10.1145/1244002.1244256. ISBN: 978-1-59593-480-2.
Chen et al., An Encryption and Probability based Access Control Model for Named Data Networking, Dec. 2014, IEEE 33rd International Performance Computing and Communications Conference, pp. 1-8 (Year: 2014).

* cited by examiner

SYSTEM AND MEDIA RECORDING DEVICE WITH SECURED ENCRYPTION

CROSS-REFERENCE TO RELATED APPLICATIONS

This patent application claims priority of U.S. provisional patent applications 62/676,967 and 62/676,970 filed May 26, 2018. This application is also related to U.S. Pat. No. 10,992,461 that is the national stage of PCT application number PCT/CA2016/051350, published on May 26, 2017 as WO2017/083980, and to U.S. Pat. No. 10,915,647 that is the national stage of PCT application number PCT/CA2016/051358, published on May 26, 2017 as WO2017/083985.

TECHNICAL FIELD

The present application relates to generally surveillance cameras and the related system for recording and handling media produced for use as evidence in legal proceedings and more specifically to controlling access and transmission of encrypted media recordings.

BACKGROUND

Before the age of digital videos, when it came to submitting analog video as evidence, there was a small concern regarding the evidence being exposed to the risk of tampering. Analog video editing equipment that would produce a tampered version of an original video was complicated and not readily available. The original video tape of the person who recorded an event was taken into court and played for the judge and jury. But today, most videos are recorded on hard disk drives or device memories etc., which are routinely wiped as new data comes in. Such electronic video files can be easily loaded into a computer and digitally edited to produce a tampered video which can be difficult to discern from the original video. This means that digital video evidence has to be handled more carefully to avoid tampering, for example it can be transferred onto a fixed medium such as a write-once, read-many (WORM) DVD medium or onto a secure server with a high level of access control, requiring very careful procedures, witnessing, and documentation to prove in a court of law that it is an unedited 'exact duplicate copy' of the original."

Also, we live in an age where recorded video can be edited to rearrange the chronology of events depicted, distort the passage of time, and show events out of sequence and context. This poses a significant problem when the video is to be used in a legal proceeding.

As a result, video evidence must be authenticated in order to gain admissibility in a court proceeding. Authentication can be accomplished by witnesses familiar with the video content—for example, the person who captured the video images—or technically, showing that the images have not been altered in any improper way. This is the requirement in most legal jurisdictions.

Chain of custody can be understood to refer to the chronological documentation or paper trail that records the sequence of custody, control, transfer, analysis, and disposition of physical or electronic evidence. In the case of electronic evidence, a person having control or oversight of an electronic device or system that is used to collect electronic evidence, such as a camera, transfers one or more data files related to the electronic evidence to secure storage. That person, or the persons, must be able to attest to the authenticity of data files from the moment of collection until the moment of transfer to and from the secure storage facility.

Whenever a data file is made available for editing, its authenticity can be challenged. It is important in the case of electronic evidence to ensure that the chain of custody reduces the risk of any evidence tampering.

Evidence can be obtained from a variety of sources including police body cameras, cameras mounted to patrol cars, dashboard cameras, and other cameras. If the chain of custody of the video evidence is not proven (e.g., because of inadequate documentation) the video evidence may not be admissible by courts.

The videos created by video devices used by police forces such as dashcams, body cams are good examples of the videos used as evidence in legal proceedings. Hence, chain of custody (CoC) is an important factor about these videos. CoC refers to the chronological documentation or paper trail that records the sequence of custody, control, transfer, analysis, and disposition of physical or electronic evidence which is particularly important in criminal cases.

Body worn video ("BWV") or a body camera, body-worn camera, are small cameras which can be clipped onto a police officer's uniform or worn as a headset and turned on to record video and audio of law enforcement encounters with the public. The video is often saved with time and date stamps and GPS coordinates. Some body cameras offer real-time video streaming. Some cameras offer Bluetooth trigger options for automatic recording. Agencies can select input that triggers body-worn cameras to automatically turn on without manual activation, such as turning on a cruiser's lights or sirens, crash sensor activation, when the car reaches a certain speed, or when nearby dashboard cameras or body cameras are switched on. A new wireless holster sensor can alert body cameras when a gun is drawn. Some body-worn cameras provide 30 seconds of sound-free video footage from before the time the camera officially starts recording. Footage is uploaded to external databases maintained by police agencies or to third party vendors.

A dashcam, dashboard camera, is an onboard camera that continuously records the view through a vehicle's windscreen. It may be attached to the interior windscreen or to the top of the dashboard, by suction cup or adhesive-tape mount. Police dashcams may provide video evidence in the event of a road accident.

Additionally, police forces frequently use different types of cameras which could be mounted on vehicles or stationary posts.

The recordings of such devices are subject to the same regulations as other video recordings. In order to be admissible in a legal proceeding, it must be demonstrated that the chain of custody has been respected. By reducing the number of intermediaries, meeting such requirement can be much easier. There exists a need for a system that reduces number of intermediaries in handling of such evidences.

Furthermore, the body camera devices currently used by the police forces expose a risk if they are stolen as, in addition to the risk of loss of evidence, there exist a risk of losing private information of the public.

Moreover, most such devices are only protected by a simple pin code which would allow any person to have access to the media recorded by the camera. An example of such a system is illustrated in FIG. 1A. This increases the risk of tampering and reliability of the information.

Therefore, there exists a need for a system with improved security for devices that are mostly used by law enforcement officers.

SUMMARY

The present disclosure provides, inter alia, novel and innovative solutions for the above-mentioned needs in the art which will become apparent to those skilled in the art once given this disclosure.

Applicant has discovered that properly managed encryption of media recorded in the memory of a media recording device or a device, such as a camera, where the device is structured to prevent access to the media without the media being securely encrypted, allows for the media to be transferred from the device to secure storage, for example secure storage controlled by law enforcement agencies, without exposing the media to possible tampering so that the management of the chain of custody of the media is simplified.

To manage encryption of media properly, Applicant proposes to use encryption of the type disclosed in its co-pending patent application Ser. No. 15/776,448 filed on May 16, 2018 that is the national stage of PCT application number PCT/CA2016/051350, published on May 26, 2017 as WO2017/083980, the contents of which are incorporated herein by reference. Management of access control and encryption of media streams is also disclosed in Applicant's co-pending patent application Ser. No. 15/776,436 filed on May 16, 2018 that is the national stage of PCT application number PCT/CA2016/051358, published on May 26, 2017 as WO2017/083985, the contents of which are incorporated herein by reference. The encryption disclosed allows the device to randomly create symmetric encryption keys that can be changed over time to encrypt media and to transmit to a storage server the encrypted media. Meanwhile, the symmetric encryption keys are encrypted using the public key of an entity that will provide access to authorized personnel of the media files. This entity can use its private key to decrypt the symmetric keys and use them appropriately so that the authorized personnel can have access to the media.

As an alternative to the encryption disclosed in WO2017/083980, Applicant also proposes to provide both the device and the entity that will provide access to authorized personnel of the media files with symmetric encryption keys to be used according to a known schedule over time by the device to encrypt the media files. The providing of the symmetric keys can be done, for example, using a secure wired connection between the device and a computing device that performs the role of the entity that will provide access to authorized personnel of the media files with symmetric encryption keys. In some cases, this entity will be part of a secure media server that can access the encrypted media, decrypt it and provide a copy to the authorized personnel. Such a copy can be separately encrypted if desired.

This patent application provides complementary improvements that may be applied separately or in combination. The present disclosure discloses a media recording device with video encryption ability which can be used for any kind of surveillance such as body worn video ("BWV") cameras, dashboard camera or police car cameras.

In one aspect the present invention discloses a device for recording media for use as evidence in legal proceedings. The device disclosed is comprised of a recording unit producing original, unencrypted media, a symmetric encryption module configured to use a symmetric encryption key to encrypt said unencrypted media to produce encrypted media, a memory for storing at least one of said unencrypted media and said encrypted media, an interface module configured to transmit said encrypted media and to prevent external access to the unencrypted media and the symmetric encryption key.

In another aspect the present disclosure provides a server also referred to herein as an evidence vault or vault for handling media from a media recording device for use as evidence in legal proceedings, the server comprising a decryption module having secure access to a symmetric encryption key used by said media recording device providing encrypted media and configured to produce a decrypted copy of said encrypted media, an authentication module configured to authenticate a user to access encrypted media; and an access control module configured to provide to said user either said decrypted copy or a re-encrypted version of said decrypted copy.

In another aspect the present invention disclose system for recording and handling media for use as evidence in legal proceeding. The system disclosed comprises of a device also referred to herein as a "camera" or a "media recording device" and a server also referred to herein as "a vault" or "evidence vault". The media recording device comprises of a recording unit producing original, unencrypted media, a symmetric encryption module or unit configured to use a symmetric encryption key to encrypt said unencrypted media to produce encrypted media, a memory for storing at least one of said unencrypted media and the encrypted media, an interface module configured to transmit said encrypted media and to prevent external access to said unencrypted media and said symmetric encryption key. The server comprises a decryption module having secure access to the symmetric encryption key configured to produce a decrypted copy of the encrypted media transmitted from the interface module, an authentication module configured to authenticate a user to access encrypted media, and an access control module configured to provide to said user either said decrypted copy or a re-encrypted version of said decrypted copy.

The system may have multiple different embodiments. In one embodiment, the media recording device, details of which is further explained herein, generates symmetric encryption keys and encrypts the recording using those keys before transferring the encrypted media recordings to the server. The server needs the symmetric encryption keys to decrypt the recording. To transfer these keys from the media recording device to the server the system either uses a secure connection or encrypts the symmetric encryption keys asymmetrically and send them to the server or vault over a secure or an unsecured connection. The encryption would be done using an asymmetric encryption method wherein the system sends a public encryption key of the server to the device and uses said public encryption key to asymmetrically encrypted the symmetric encryption keys. This encryption can be only decrypted using a private encryption key of the evidence vault. Therefore, only the server can decrypt the symmetric encryption keys and subsequently the recordings.

In another embodiment the system sends the symmetric encryption keys from the vault to the media recording device so that the camera uses the symmetric encryption key to symmetrically encrypt its recordings. To transfer these keys from the server to the device, the system either uses a secure connection or encrypts the symmetric encryption keys and send them to the device over a secure or unsecured connection. The encryption would be done using an asymmetric encryption method wherein the system sends a public encryption key of the device to the server and uses said public encryption key to asymmetrically encrypted the symmetric encryption keys. This encryption can be only decrypted using a private encryption key of the camera. Therefore, only the device can decrypt the symmetric encryption keys. The server also keeps a copy or log of the symmetric encryption keys of the symmetric encryption keys it sends to the device which it later used to decrypt the encrypted media recordings it receives from the camera.

In some embodiments, the symmetric encryption module as disclosed herein is configured to randomly generate the symmetric encryption key, the device further comprises an asymmetric encryption module configured to encrypt said symmetric encryption key using a public key of said server, said interface module is further configured to transmit said encrypted symmetric encryption key to said server, said server further comprising an asymmetric decryption module configured to receive said encrypted symmetric encryption key, and to use a private key of said server to asymmetrically decrypt said encrypted symmetric encryption key to provide said symmetric key.

In some embodiments, the server as disclosed herein is configured to randomly generate said symmetric encryption key, said server further comprises an asymmetric encryption module configured to encrypt said symmetric encryption key using a public key of said device, said interface module is further configured to receive said encrypted symmetric encryption key from said server, said device further comprising an asymmetric decryption module configured to receive said encrypted symmetric encryption key, and to use a private key of said device to asymmetrically decrypt said encrypted symmetric encryption key to provide said symmetric key to said symmetric encryption module.

In some embodiments, the symmetric encryption module is configured to randomly generate a large number of said symmetric encryption keys for use according to a schedule, said interface module and said server comprising a secure local connection for transferring said large number of symmetric encryption keys from said device to said server for use by said decryption module according to said schedule.

In some embodiments, the decryption module is configured to randomly generate a large number of said symmetric encryption keys for use according to a schedule, said interface module and said server comprising a secure local connection for transferring said large number of symmetric encryption keys from said server to said device for use by said symmetric encryption module according to said schedule.

In some embodiments, the device producing videos may be a body-worn camera. In one embodiment, the device may have a wireless network transceiver for transmitting said encrypted media.

In some embodiments, the device is comprising a wireless network transceiver for transmitting said encrypted media and said encrypted symmetric encryption key.

In some embodiments, the symmetric encryption module is configured to use AES 128 bit or AES 256 bit encryption.

In some embodiments, the present disclosure provides the method of using the system, the device or the server as disclosed by different embodiments as disclosed herein for storing information with digital signature to preserve the integrity of evidence.

BRIEF DESCRIPTION OF THE DRAWINGS

The invention will be better understood by way of the following detailed description of embodiments of the invention with reference to the appended drawings, in which:

FIG. 10 shows a block diagram of the present invention in accordance to one embodiment wherein a symmetric key store receives the symmetric encryption keys from a server by asymmetric encryption and the vault uses a copy of the symmetric encryption keys. To decrypt the recordings.

DETAILED DESCRIPTION

Figure 1A:
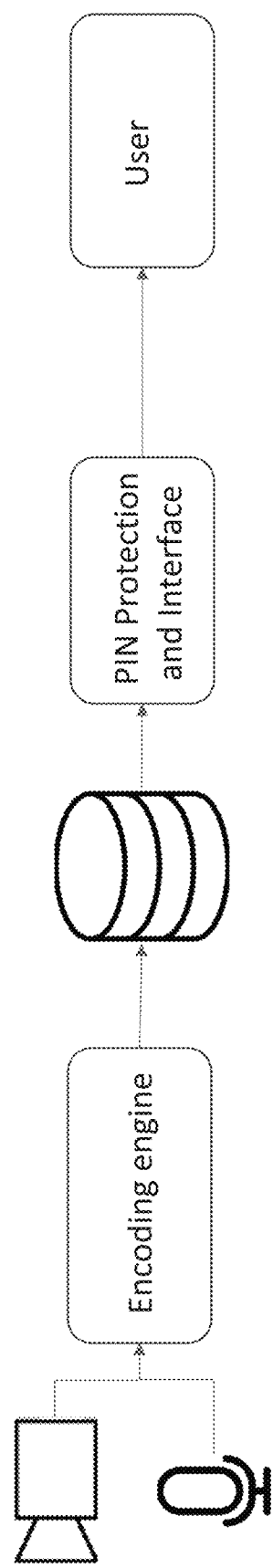
FIG. 1A shows a block diagram of a prior art surveillance device limiting access to the media recordings using a pin protection method.

The Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

The methods and details of symmetrical and asymmetrical encryption and the double layer security measure used herein has been disclosed by the applicant's co-pending U.S. patent application Ser. No. 15/776,448 and the PCT application number PCT/CA2016/051350 which are incorporated herein by reference.

Throughout this application terms "recordings", "media recordings" and "media" have been used interchangeably. Also, terms "server", "evidence vault", "vault" and server have been used interchangeably but it will be appreciated by those skilled in the art that while a vault can be a server with all the features but as referred to in some embodiments it may have a simpler structure and not have all the features of a server as defined herein.

This patent application provides complementary improvements that may be applied separately or in combination.

In one aspect the present invention disclose system for recording and handling media for use as evidence in legal proceeding. The system disclosed comprises of a device also referred to herein as a "camera" or a "media recording device" and a server also referred to herein as "a vault" or "evidence vault". The media recording device comprises of a recording unit producing original, unencrypted media, a symmetric encryption module or unit configured to use a symmetric encryption key to encrypt said unencrypted media to produce encrypted media, a memory for storing at least one of said unencrypted media and the encrypted media, an interface module configured to transmit said encrypted media and to prevent external access to said unencrypted media and said symmetric encryption key.

The server comprises a decryption module having secure access to the symmetric encryption key configured to produce a decrypted copy of the encrypted media transmitted from the interface module, an authentication module configured to authenticate a user to access encrypted media, and an access control module configured to provide to said user either said decrypted copy or a re-encrypted version of said decrypted copy.

The server is configured to be able to encrypt and decrypt both symmetrical and asymmetrical encryption. The server connects directly to a device and receives encrypted media recordings of the device that can be only decrypted by the server reducing the risk of the recording being tampered. Furthermore, the system makes it easier to comply with the chain of custody requirement for the legal proceedings by reducing the number of people involved in the retrieval of the recordings. The system provides a solution for transferring both the symmetrically encrypted media recordings of a device and an asymmetrically encrypted key to the encrypted media recordings over a secure or an unsecure wireless, wired or cloud connection using a double layer security measure. It provides a direct mechanism for collecting the media recordings of the device without providing intermediaries access to the content of the recordings, hence reducing risk of tempering of the media recordings which is desirable especially for the purposes of legal proceedings.

Figure 6:
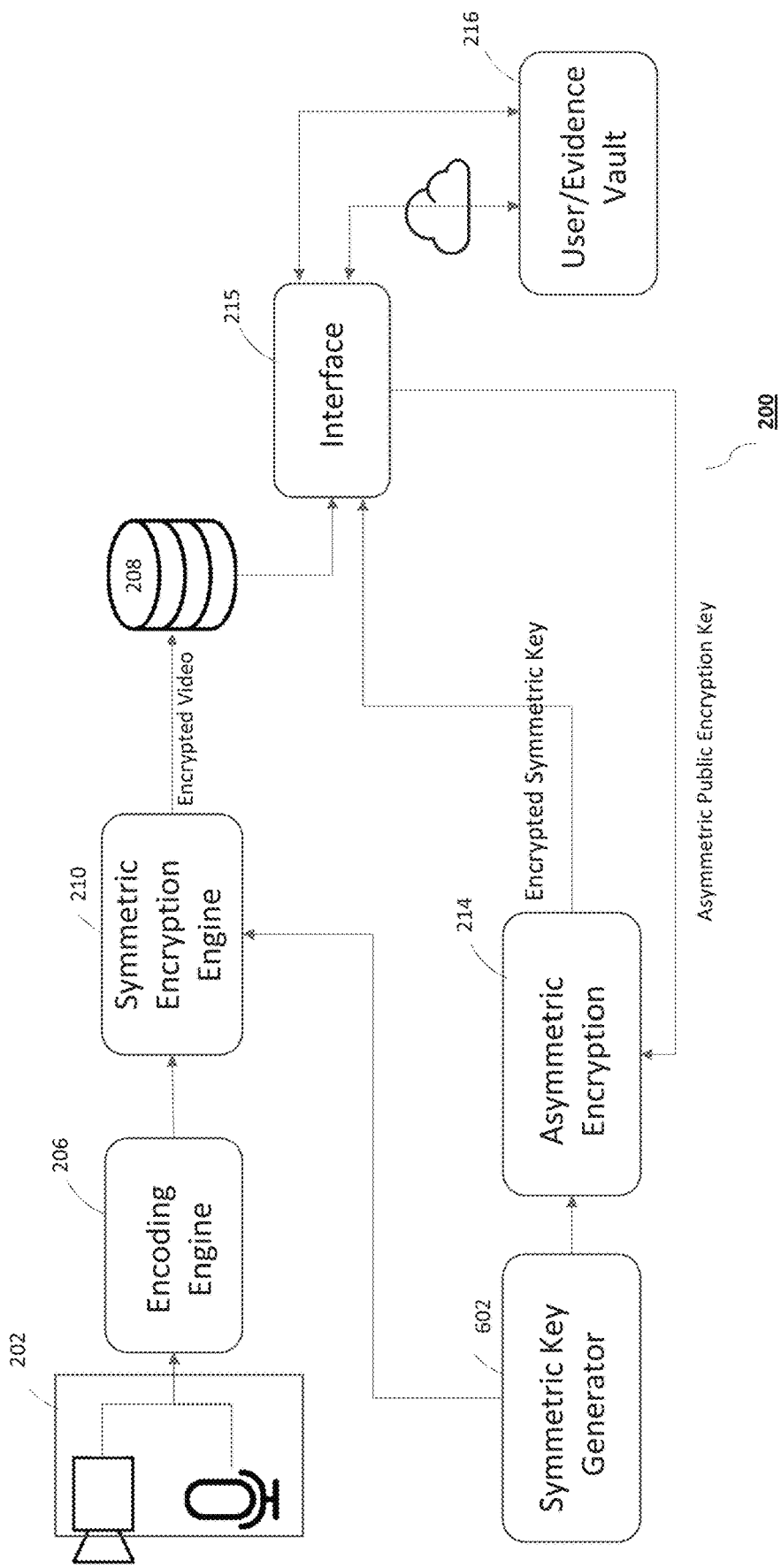
FIG. 6 shows a block diagram of the present invention in accordance to one embodiment wherein a symmetric key generator generates the symmetric encryption keys locally.
Figure 8:
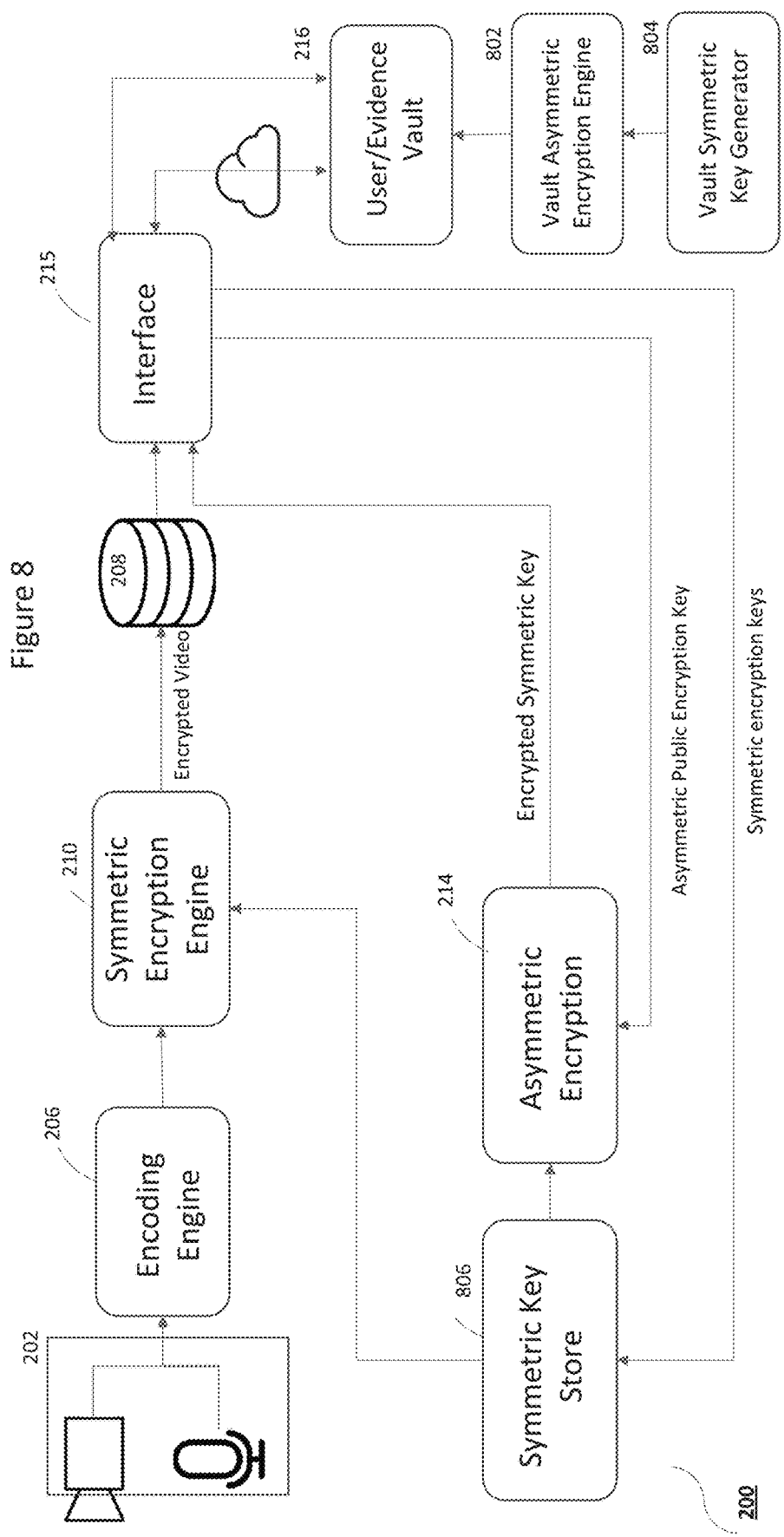
FIG. 8 shows a block diagram of the present invention in accordance to one embodiment wherein a symmetric key store receives the symmetric encryption keys from a server by asymmetric encryption.

In the embodiments and the drawings disclosed in this application, the symmetric encryption module has been referred to by its comprising elements. In the different embodiments the symmetric encryption module has been described as a symmetric encryption engine with or without a symmetric key unit which itself can be a symmetric key generator or a symmetric key store (FIGS. 6 and 8).

It will be appreciated by those skilled in the art that the device as claimed can be any media and video recording device but in preferred embodiments it refers to a device such as a body-worn camera, a dash camera or a security camera used by law enforcement.

Furthermore, while the symmetric encryption module may use any symmetric encryption methods, in some embodiments, it uses AES 128 bit or AES 256 bit encryption. Such encryption is generally recognized as being strong encryption. By changing the symmetric key periodically, it will be appreciated that the media encrypted can be considered to be sufficiently secured so as to eliminate any reasonable possibility of tampering.

The system can work in multiple different manners. In one embodiment further explained herein, the device generates symmetric encryption keys and encrypts the recording using those keys before transferring the encrypted media recordings to the evidence vault. The vault would need the symmetric encryption keys to decrypt the recording. To transfer these keys from the device to the server the system either uses a secure connection or encrypts the symmetric encryption keys and send them to the vault over a secure or unsecured connection. The encryption would be done using an asymmetric encryption method wherein the system sends a public encryption key of the server to the device and uses said public encryption key to asymmetrically encrypted the symmetric encryption keys. This encryption can be only decrypted using a private encryption key of the evidence vault. Therefore, only the server can decrypt the symmetric encryption keys and subsequently the recordings.

In another embodiment the system sends the symmetric encryption keys from the vault to the device so that the device uses the symmetric encryption key to symmetrically encrypt its media recordings. To transfer these keys from the to the server to the device the system either uses a secure connection or encrypts the symmetric encryption keys and send them to the device over a secure or unsecured connection. The encryption would be done using an asymmetric encryption method wherein the system sends a public encryption key of the device to the server and uses said public encryption key to asymmetrically encrypted the symmetric encryption keys. This encryption can be only decrypted using a private encryption key of the camera. Therefore, only the device can decrypt the symmetric encryption keys. The server also keeps a copy or a log of the symmetric encryption keys it sends to the device which it later uses to decrypt the encrypted media recordings it receives from the camera.

In another aspect, the present disclosure discloses a media recording device with video encryption ability which can be used for any kind of surveillance purposes such as body worn video ("BWV") cameras, dashboard camera or police car cameras. The device disclosed is comprised of a recording unit producing original, unencrypted media, a symmetric encryption module configured to use a symmetric encryption key to encrypt said unencrypted media to produce encrypted media, a memory for storing at least one of said unencrypted media and said encrypted media, an interface module configured to transmit said encrypted media and to prevent external access to said unencrypted media and said symmetric encryption key.

In another aspect the present disclosure provides a server also referred to herein as an evidence vault or vault for handling media from a media recording device for use as evidence in legal proceedings, the server comprising a decryption module having secure access to a symmetric encryption key used by said media recording device providing encrypted media and configured to produce a decrypted copy of said encrypted media, an authentication module configured to authenticate a user to access encrypted media; and an access control module configured to provide to said user either said decrypted copy or a re-encrypted version of said decrypted copy.

Figure 1B:
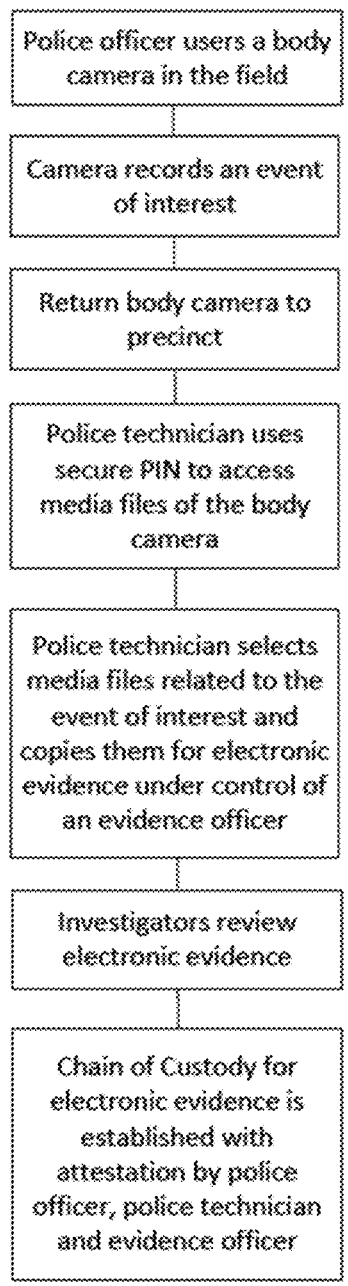
FIG. 1B is a flowchart showing the process of collecting video evidence from a body camera in accordance to the devices available in the art.
Figure 1C:
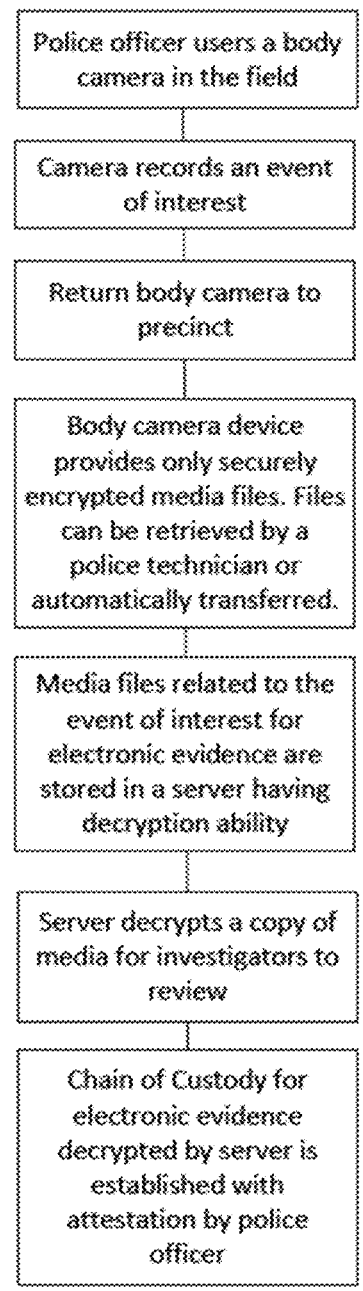

FIG. 1B shows a flowchart of the steps that has to be taken to use the media recordings of a body camera currently available in the art in legal proceedings. After the police officer uses a body camera in the field, he/she returns the body camera to the precinct where a technician uses security PIN to access media files of the body camera. The police technician selects the media files related to the event of interest and copies them as electronic evidence under control of an evidence officer. Investigators then review the electronic evidence. In order to use such evidence in a legal proceeding the chain of custody has to be established by having all the people involved in the processing of the evidence, police officer, police technician and evidence officer sign affidavits attesting the authenticity of the evidence.

Figure 10:
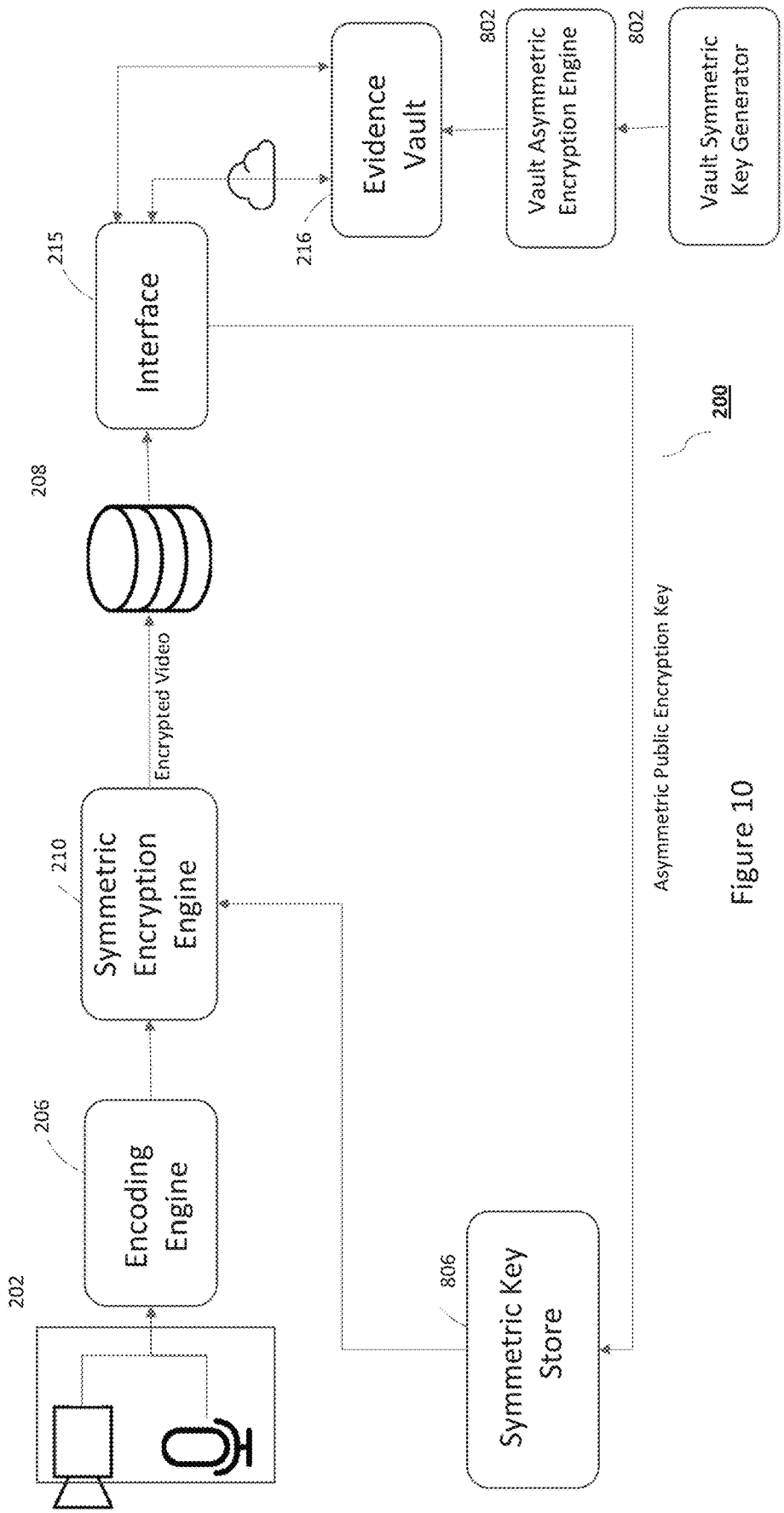
FIG. 10 is a flowchart showing the process of collecting video evidence from a body camera in accordance to an embodiment of the present invention.

FIG. 10 shows a flowchart of the steps that has to be taken to use media recordings of a body camera in accordance to one embodiment of the present invention in a legal proceeding. Police officer wears a body camera in the field and returns the body camera to precinct. The body media recording device only provides securely encrypted media files. Files can be retrieved by a police technician or automatically transferred, and the media files related to the event of interest may be stored in a server with decryption ability. Server decrypts the media file and sends a copy of media for investigators to review but keeps the original copy. Chain of Custody for electronic evidence decrypted by server is easily established with attestation of only the police officer.

Figure 2:
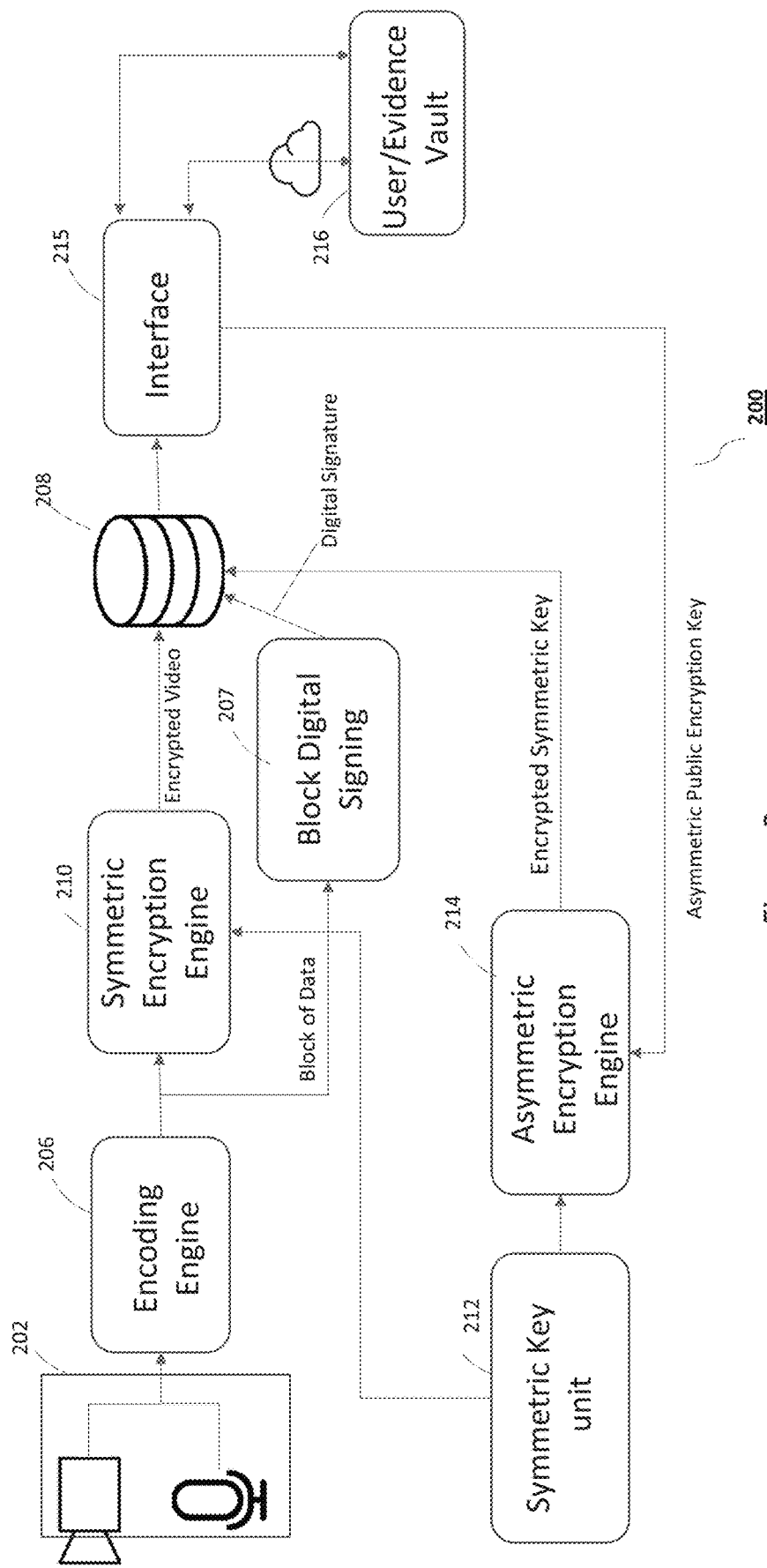
FIG. 2 shows a block diagram of the present invention in accordance to one embodiment wherein the media recordings are encrypted before being saved on a memory of the camera.

In one embodiment, as illustrated in FIG. 2, a recording unit 202 which may have video and/or audio recording features provides its unencrypted media recordings to an encoding engine 206 which encodes the media recordings received. Although not shown, the camera 200 can have a user control button to start and stop recording, as is known in the art of BWC devices. A symmetric encryption engine 210 receives the encoded media recordings from the encoding unit 206 and uses symmetric encryption keys it receives from a symmetric key unit 212 to encrypt the media recordings before transferring it to a memory 208. The recording then may be transmitted to a server 216. In order for the server 216 to open the encrypted recordings, it needs the symmetric encryption keys, therefore, the symmetric encryption keys also have to be transferred to the server 216. To transfer the symmetric encryption keys to the server 216, the device 200 encrypts the symmetric encryption keys using an asymmetric encryption module 214. The asymmetric encryption module uses an asymmetric public encryption key of the server to encrypt the symmetric encryption keys. This encrypted symmetric key is then stored in the memory 208 either as a part of the encrypted recording file or as a separate file before being transferred to the vault through an interface module 215. This transfer may be through a secured or unsecured wireless or wired connection.

It will be appreciated that the server that stores the encrypted media can be separate or integrated with the server that authenticates a user to be able to view or listen to the media. The media can be decrypted by the user's computer or device, or it can be decrypted at a server. It is possible to provide a user with the encrypted media with a lower level of authorization, if any, than for providing the user with the encryption keys. For example, what is called an evidence vault 216 can comprise a file server for encrypted media files that has reduced security and an access control server that securely provides decryption keys for encrypted media files to authorized users.

The symmetric encryption engine 210 can be a hardware encryption circuit as is known in the art. The encoding engine 206 can also be a hardware video and/or audio codec as is known in the art. Asymmetric encryption engine 214 is much easier to provide by way of software executed by a computer processor than in circuitry, however, complex hardware implementations of RSA encryption are known in the art. The device 200 can also make use of a processor and software to provide for engines 206, 210 and 214 if desired. Software media encoding and encryption are known in the art.

FIG. 2 also illustrates an optional block digital signature module 207. This module can calculate a hash value, checksum or CRC value (a signature value) of blocks of the data based on the data either before or after encryption. The size of the blocks for signature can be different from the size of the blocks for encryption, if desired. The signature process serves to provide a statistically high level of confidence that the data is not tampered with when the signature matches the calculated signature on the received block of data. The signature value can be encrypted using a private key using asymmetric encryption. The corresponding public key can be included with the digital signature or otherwise made available to the receiver. This process can be understood as digitally signing the blocks of data. The digital signatures may allow for the user at interface 216 to verify the authenticity of the data as captured and encrypted at the source 202. Alternatively, the key required to decrypt and confirm the signature's validity can be reserved for a given attestor or authenticator server component or user separate from the user 216. By providing the digital signature in this manner, it can be easier to ascertain the authenticity of the encrypted data.

Upon receiving the encrypted recording and the symmetric encryptions keys encrypted asymmetrically, the vault uses a private asymmetrical key to decrypt the symmetric encryptions keys encrypted asymmetrically. The private key is a unique key that matches its counterpart public key and can be used to decrypt the symmetric encryptions keys encrypted asymmetrically. Subsequently, it uses the decrypted symmetric encryptions keys to decrypt the recordings.

Figure 3:
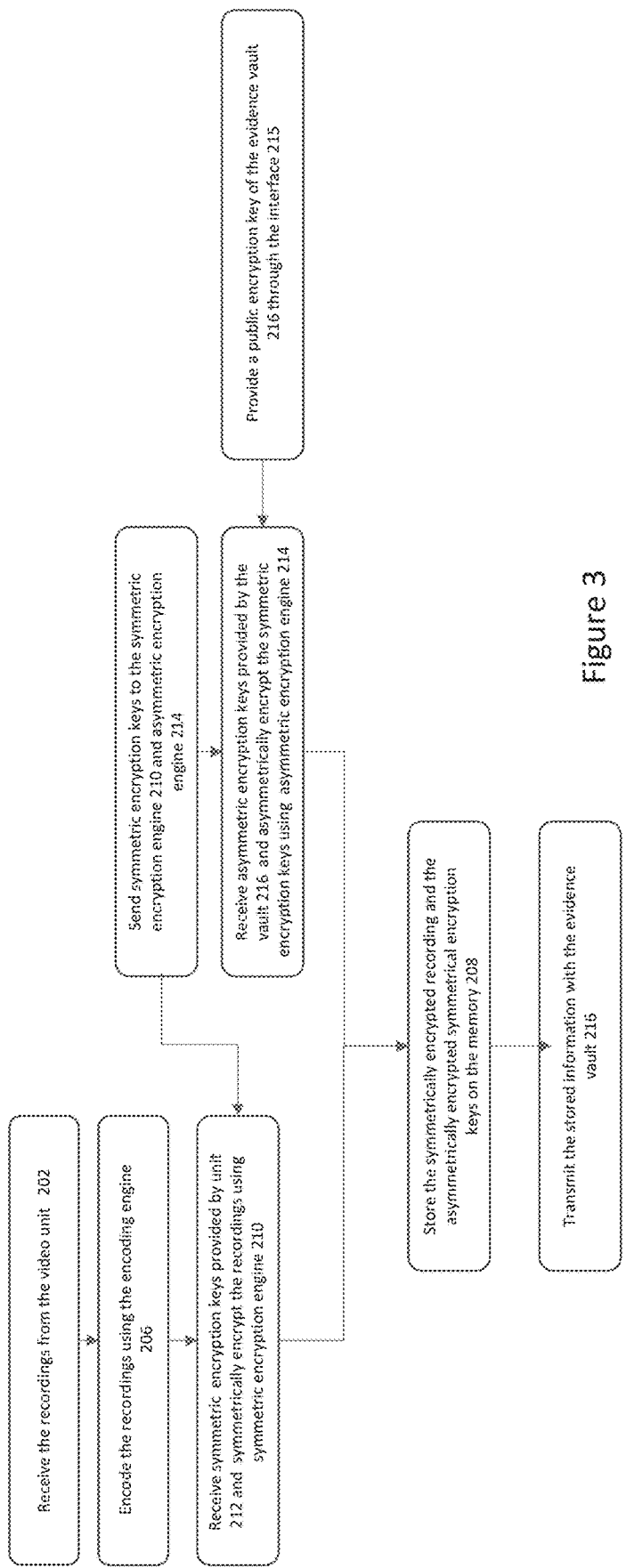
FIG. 3 is a flowchart of the process used by the device shown in FIG. 2 to transfer media recordings to an evidence vault.

FIG. 3 illustrates a flowchart of the steps taken by the system shown in FIG. 2. The encoding engine 206 receives the media recordings from the recording unit 202 and processes them to reduce the size of the media recordings using the available techniques known in the art. The encoded media recordings then go through the symmetric encryption engine 210. To encrypt the encoded media recordings the engine 210 uses symmetric encryption keys that it receives from the symmetric key unit 212. The symmetrically encrypted media recordings then get saved on the memory 208 from which they can be transferred to the server 216 or any other authorized device using the interface module 215.

The server then needs the symmetric encryption keys to decrypt the encrypted recording. In order to securely transmit the keys to the vault 216, the device asymmetrically encrypt the symmetric encryptions keys. This is achieved by use of the evidence vault's public key which may be shared by the device 200 through the interface module 215. The asymmetric encryption engine 214 used the vault's public key to encrypt the symmetric encryption keys to be saved on the memory 208 and transferred to the vault via the interface module 215. The encrypted keys may be transferred as a separate file or be attached to the encrypted recording file.

Upon receiving the asymmetrically encrypted symmetrical keys, the vault decrypts the symmetrical keys using its private key then uses the symmetrical keys to decrypt the encrypted recordings.

Figure 4:
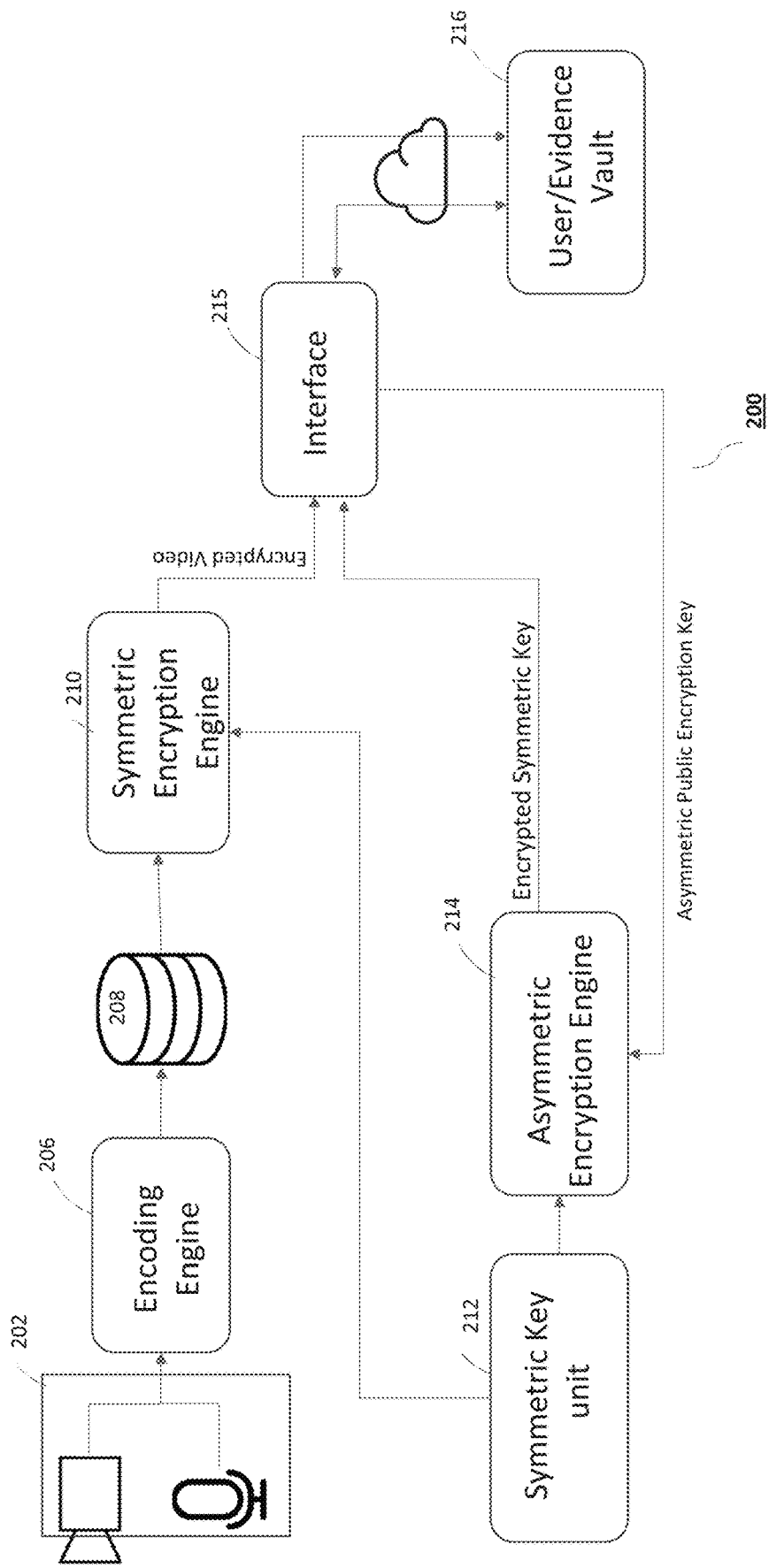
FIG. 4 shows a block diagram of the present invention in accordance to one embodiment wherein the media recordings are stored on the memory and only encrypted upon receiving a transfer request.

Referring to FIG. 4, according to some embodiments, the disclosed invention may collect the encoded media recordings from encoding engine 206 and directly store them on the memory 208 before encrypting the recordings. The memory 208 is protected by any of the available techniques in the art such as pin protection to limit access to the recordings. The memory 208 would only allow access through the interface module 215 and after having the media recordings encrypted. This would allow the device to only start the encryption process which is a more computing intensive process when it receives a request through the interface module 215. This may reduce the chances of the device 200 having problems during recordings. Furthermore, since the unencrypted media recordings take less memory space it would allow the device to collect the media recordings for a longer period of time before it needs to be erased.

Figure 5:
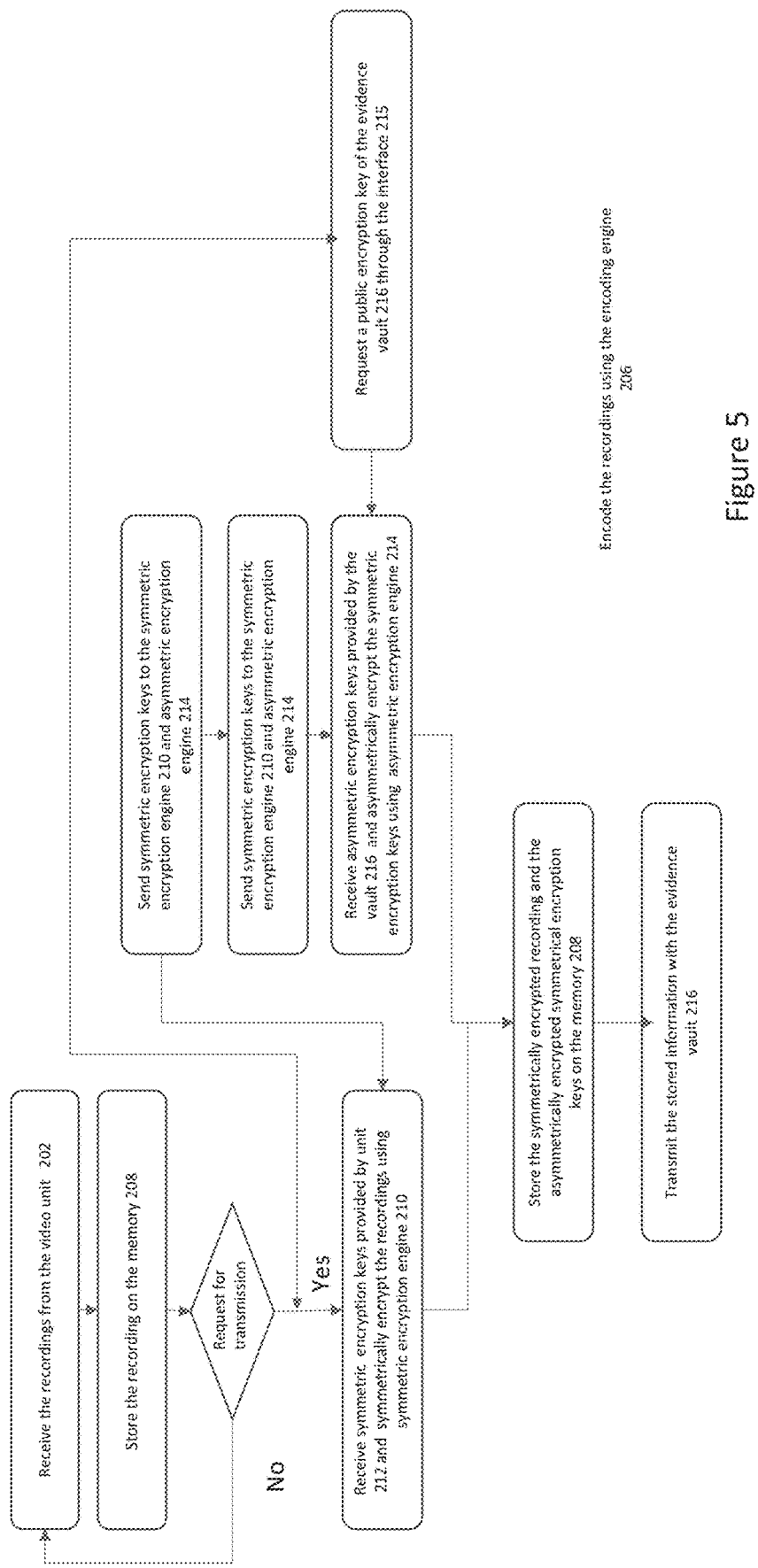
FIG. 5 is a flowchart of the process used by the device shown in FIG. 4 to transfer media recordings to an evidence vault.

Referring to FIG. 5 illustrating a flowchart of the steps taken by the system shown in FIG. 2. The encoding engine 206 receives the media recordings from the recording unit 202 and process them to reduce the size of the media recordings using the techniques known in the art. The encoded media recordings then get directly stored on the memory 208. This would allow the device to save a longer period of media recordings as the unencrypted media recordings are typically smaller. Upon receiving a request from the server 216 through the interface module 215, the symmetric encryption engine 210 gets the symmetric encryption keys from the symmetric key unit 212 and encrypts the media recordings before sending them to the vault via the interface module 215. At the same time that the vault requests the recording it provides asymmetric encryption engine 214 with its public encryption key. The asymmetric encryption engine 214 uses the public encryption key to encrypt asymmetrically the symmetric encryption codes to transfer them to the server 216.

Upon receiving the asymmetrically encrypted symmetrical keys, the vault decrypts the symmetrical keys using its private key then uses the symmetrical keys to decrypt the encrypted recordings.

It will be appreciated that in presence of a secure connection the symmetric encryption keys may be transferred to the vault 216 without encryption.

In some embodiments, the symmetric key unit can be a symmetric key generator 602, as illustrated in FIG. 6, which produces the symmetric encryption keys locally while in some other embodiments as in FIG. 8, it is a symmetric key store 806 which receives the symmetric encryption key from the server 216 or a vault keeper (not shown here) through the interface module 215.

Figure 7:
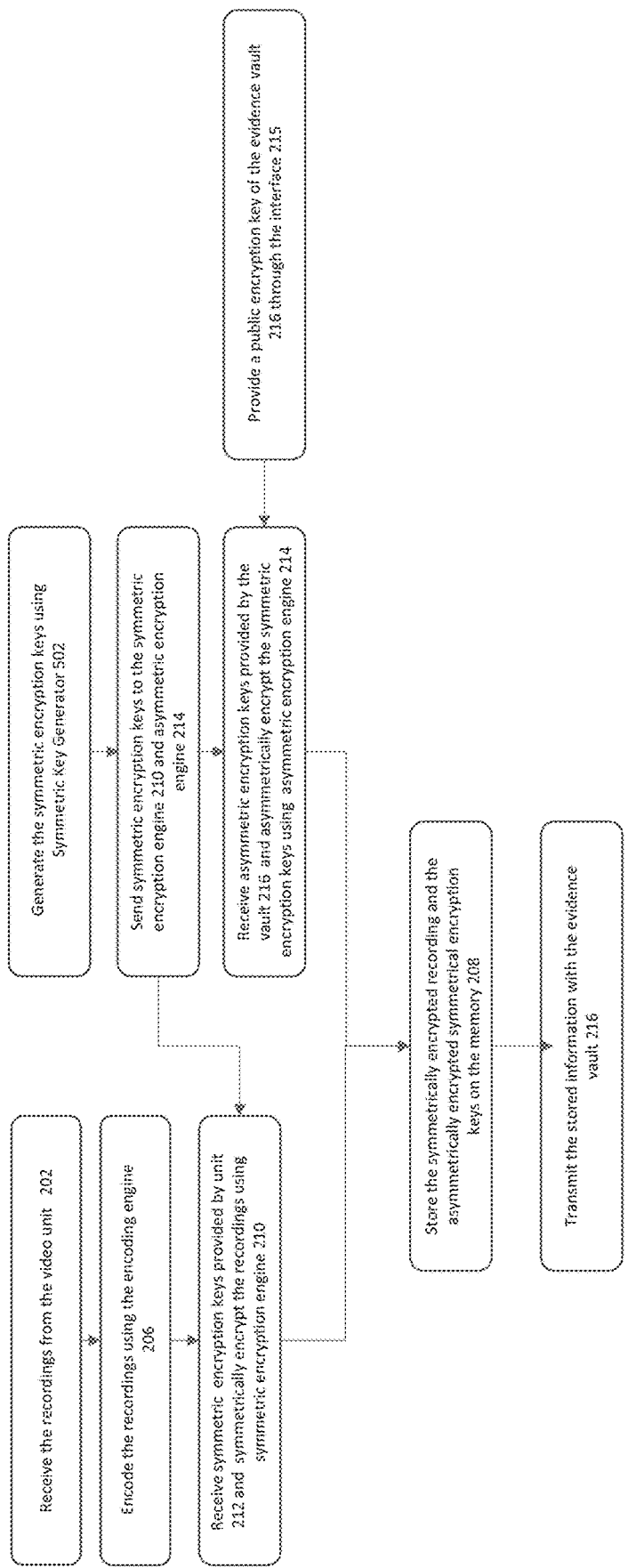
FIG. 7 is a flowchart of the process used by the device shown in FIG. 6 to transfer media recordings to an evidence vault.
Figure 9:
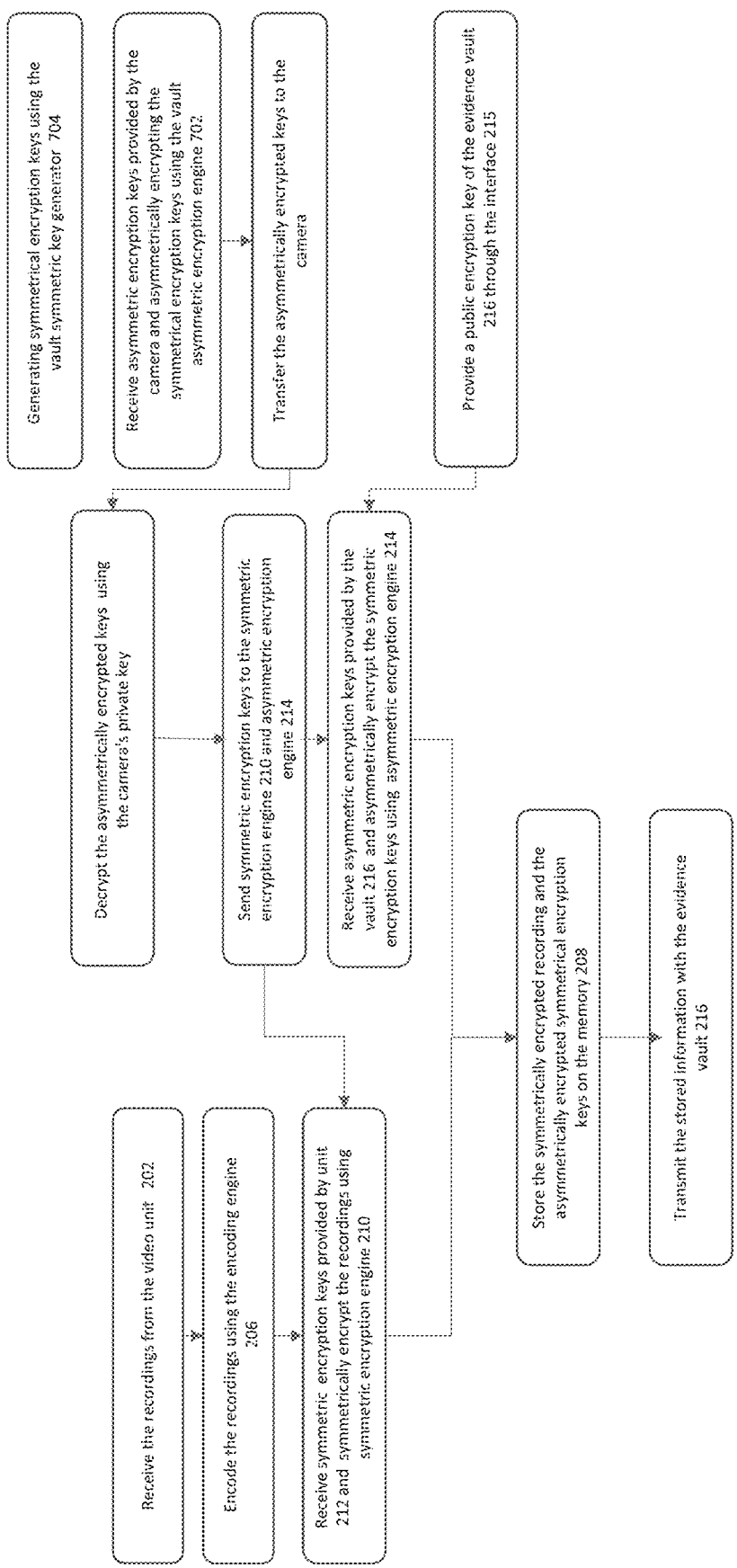
FIG. 9 is a flowchart of the process used by the device shown in FIG. 8 to transfer media recordings to an evidence vault.

The flowchart shown in FIG. 7 illustrates the steps the device 200 takes when the symmetric key generator generates the symmetric encryption keys locally. The symmetric encryption keys are simply transferred from the key generator 602 to the symmetric encryption engine 210. The FIG. 9 shows a flowchart of the embodiment in which the symmetric encryption keys are not generate locally and have to be transferred to the device from the server or the vault keeper. While such transfer can be done in an unencrypted in the presence of secure connection, it would be preferred to asymmetrically encrypt the symmetric encryption keys generated by a vault symmetric key generator 804 using a vault asymmetric encryption engine 702 before transmitting it through the interface module 215 to the symmetric key store 806. To this purpose, the asymmetric encryption engine 802 has to use a public encryption key of the device 200 to encrypt the symmetrical encryption keys in a way that could be only decrypted by the device 200.

It will be appreciated by those skilled in the art that the in presence of secure connection between the server and the camera, there will be no need to have the symmetrical encryption keys encrypted (asymmetrically) before transferring them through the interface module 215. In such scenarios, one layer of encryption, symmetrical encryption, may be enough to assure that only the server 216 can decrypt the recordings.

As illustrated in FIG. 10, the vault 216 provides the symmetric encryption keys to the device using the vault symmetric key generator 802 and the vault asymmetric encryption engine as explained herein. It also holds a copy/log of the symmetric encryption keys sent to the device 200 saved in the server 216. This way upon receiving the encrypted media recordings form the device 200 the vault can use the copy/log of the asymmetric encryption keys saved on it to decrypt the encrypted media recordings it receives eliminating the need for the device 200 to encrypt the symmetric encryption keys and send them to the server 216.

Figure 11:
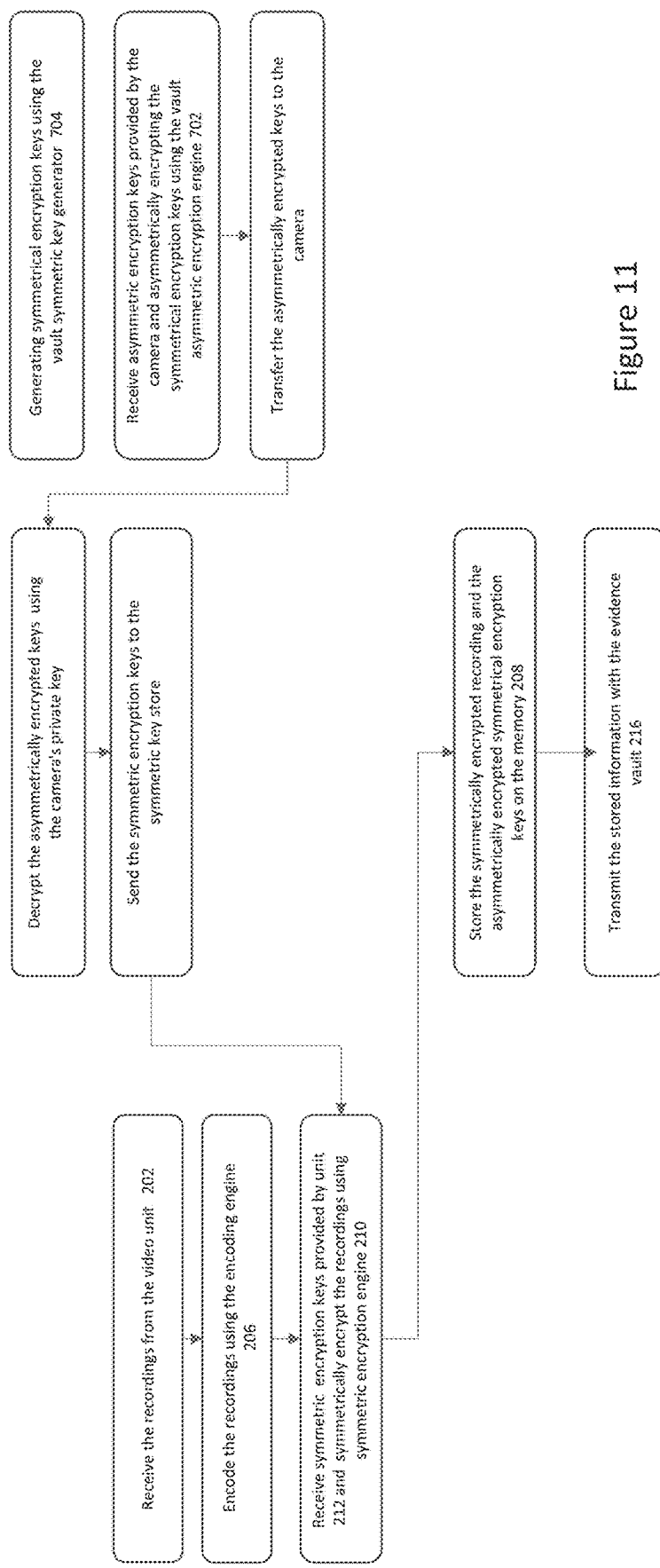
FIG. 11 is a flowchart of the process used by the device shown in FIG. 10 to transfer media recordings to an evidence vault.

FIG. 11 is a flowchart of the system shown in FIG. 10. As illustrated after receiving the symmetric encryption keys from the vault 216, the device 200 decrypts the asymmetrically encrypted keys using the camera's private key and send the symmetric encryption keys to the symmetric key store 806. Subsequently, the symmetric encryption engine 210 uses the symmetric encryption keys to encrypt the recordings. Since the vault 216 already has a copy/log of the symmetric encryption keys there will be no need to resend these keys to the vault 216 eliminating the need for asymmetric encryption at the device 200.

In some embodiments, the present invention has a GPS to provide the location the recordings. In one embodiment, the device connects to any secured or unsecured network upon detecting one and sends encrypted media recordings and the encrypted symmetrical encryption keys to the server using the network to create more space.

Figure 12:
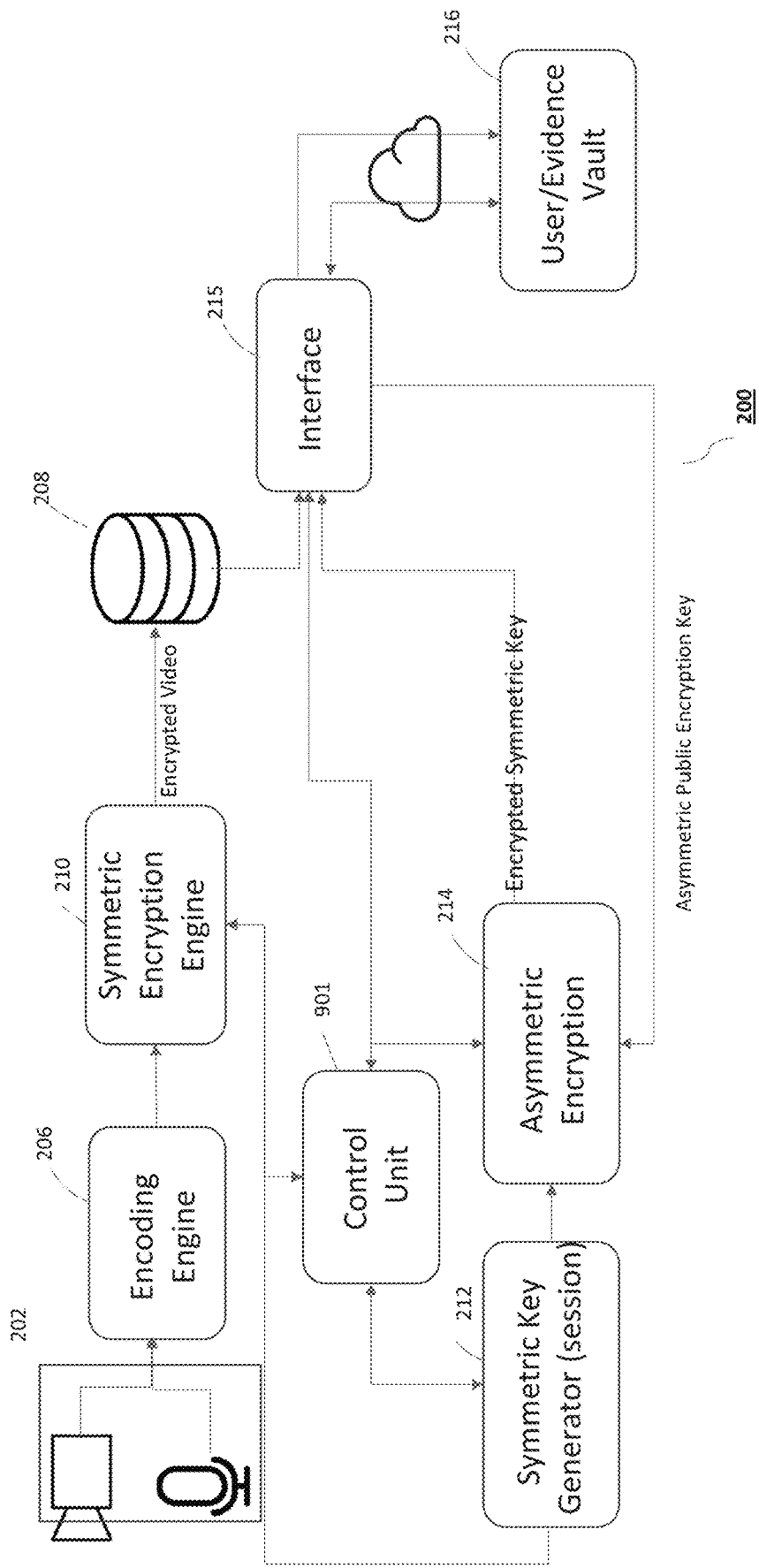
FIG. 12 shows a block diagram of the present invention in accordance to one embodiment wherein the device has an independent control unit.

In one alternative embodiments, as illustrated in FIG. 12, the present invention has a control unit which comprises a processor, and a computer-readable medium containing instructions that, when executed by said processor to cause the different units of the device to execute steps as described herein.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A system for recording and handling media for use as evidence in legal proceedings, the system comprising:
   a device comprising:
      a recording unit producing original, unencrypted media;
      a symmetric encryption module for using a symmetric encryption key to encrypt said unencrypted media to produce encrypted media;
      a memory for storing at least one of said unencrypted media and said encrypted media;

an interface module configured to transmit said
encrypted media and to prevent external access to
said unencrypted media and said symmetric encryption key;
a server comprising a processor and a non-transitory
computer-readable memory connected to said processor and storing instructions, said server having secure
access to said symmetric encryption key, wherein said
instructions are executable by said processor to cause
said server to perform authenticating a user to access
said encrypted media; and
providing to said user one of:
(a) an encrypted copy of said symmetric encryption key
for decrypting said encrypted media; and
(b) either a decrypted copy of said encrypted media
transmitted from said device or a re-encrypted version of said decrypted copy, wherein said instructions are executable by said processor to cause said
server to perform producing said decrypted copy of
said encrypted media transmitted from said device
using said symmetric encryption key;
wherein said symmetric encryption module is configured
to generate said symmetric encryption key, said device
further comprises an asymmetric encryption module
configured to encrypt said symmetric encryption key
using a public key of said server, said interface module
is further configured to transmit said encrypted symmetric encryption key to said server, wherein said
instructions are executable by said processor to cause
said server to perform receiving said encrypted symmetric encryption key, and asymmetrically decrypting
said encrypted symmetric encryption key using a private key of said server to provide said symmetric key.

2. The system as claimed in claim 1, wherein said device
is a body-worn camera.

3. The system as claimed in claim 1, wherein said device
comprises a wireless network transceiver for transmitting
said encrypted media and said encrypted symmetric encryption key.

4. The system as claimed in claim 1, wherein said
symmetric encryption module is configured to use AES 128
bit or AES 256 bit encryption.

5. A system for recording and handling media for use as
evidence in legal proceedings, the system comprising:
a device comprising:
a recording unit producing original, unencrypted
media;
a symmetric encryption module for using a symmetric
encryption key to encrypt said unencrypted media to
produce encrypted media;
a memory for storing at least one of said unencrypted
media and said encrypted media;
an interface module configured to transmit said
encrypted media and to prevent external access to
said unencrypted media and said symmetric encryption key;
a server comprising a processor and a non-transitory
computer-readable memory connected to said processor and storing instructions, said server having secure
access to said symmetric encryption key, wherein said
instructions are executable by said processor to cause
said server to perform authenticating a user to access
said encrypted media; and
providing to said user one of:
(a) an encrypted copy of said symmetric encryption key
for decrypting said encrypted media; and
(b) either a decrypted copy of said encrypted media
transmitted from said device or a re-encrypted version of said decrypted copy, wherein said instructions are executable by said processor to cause said
server to perform producing said decrypted copy of
said encrypted media transmitted from said device
using said symmetric encryption key;
wherein said server is configured to randomly generate
said symmetric encryption key, wherein said instructions are executable by said processor to cause said
server to perform encrypting said symmetric encryption key using a public key of said device, said interface
module is further configured to receive said encrypted
symmetric encryption key from said server, said device
further comprising an asymmetric decryption module
configured to receive said encrypted symmetric encryption key, and to use a private key of said device to
asymmetrically decrypt said encrypted symmetric
encryption key to provide said symmetric key to said
symmetric encryption module.

6. The system as claimed in 5, wherein said device
comprises a wireless network transceiver for transmitting
said encrypted media.

7. The system as claimed in claim 5, wherein said device
is a body-worn camera.

8. A system for recording and handling media for use as
evidence in legal proceedings, the system comprising:
a device comprising:
a recording unit producing original, unencrypted
media;
a symmetric encryption module for using a symmetric
encryption key to encrypt said unencrypted media to
produce encrypted media;
a memory for storing at least one of said unencrypted
media and said encrypted media;
an interface module configured to transmit said
encrypted media and to prevent external access to
said unencrypted media and said symmetric encryption key;
a server comprising a processor and a non-transitory
computer-readable memory connected to said processor and storing instructions, said server having secure
access to said symmetric encryption key, wherein said
instructions are executable by said processor to cause
said server to perform authenticating a user to access
said encrypted media; and
providing to said user one of:
(a) an encrypted copy of said symmetric encryption key
for decrypting said encrypted media; and
(b) either a decrypted copy of said encrypted media
transmitted from said device or a re-encrypted version of said decrypted copy, wherein said instructions are executable by said processor to cause said
server to perform producing said decrypted copy of
said encrypted media transmitted from said device
using said symmetric encryption key;
wherein said symmetric encryption module generates a
large number of said symmetric encryption keys for use
according to a schedule, said interface module and said
server being coupled via a secure local connection for
transferring said large number of symmetric encryption
keys from said device to said server for use in producing said decrypted copy of said encrypted media
according to said schedule.

9. The system as claimed in claim 8, wherein said device
is a body-worn camera.

10. A system for recording and handling media for use as evidence in legal proceedings, the system comprising:
  a device comprising:
    a recording unit producing original, unencrypted media;
    a symmetric encryption module for using a symmetric encryption key to encrypt said unencrypted media to produce encrypted media;
    a memory for storing at least one of said unencrypted media and said encrypted media;
    an interface module configured to transmit said encrypted media and to prevent external access to said unencrypted media and said symmetric encryption key;
  a server comprising a processor and a non-transitory computer-readable memory connected to said processor and storing instructions, said server having secure access to said symmetric encryption key, wherein said instructions are executable by said processor to cause said server to perform authenticating a user to access said encrypted media; and
    providing to said user one of:
      (a) an encrypted copy of said symmetric encryption key for decrypting said encrypted media; and
      (b) either a decrypted copy of said encrypted media transmitted from said device or a re-encrypted version of said decrypted copy, wherein said instructions are executable by said processor to cause said server to perform producing said decrypted copy of said encrypted media transmitted from said device using said symmetric encryption key;
    wherein said instructions are executable by said processor to cause said server to generate a large number of said symmetric encryption keys for use according to a schedule, said interface module and said server being coupled via a secure local connection for transferring said large number of symmetric encryption keys from said server to said device for use by said symmetric encryption module according to said schedule.

11. The system as claimed in claim 10, wherein said device is a body-worn camera.

12. A method for recording and handling media for use as evidence in legal proceedings, the method comprising:
  recording, at a device, unencrypted media;
  obtaining, at a server, encrypted media from the device, the encrypted media based on the unencrypted media and produced by a symmetric encryption module of the device using a symmetric encryption key;
  wherein said symmetric encryption module of the device and said server obtain said symmetric encryption key by one of:
    (a) said symmetric encryption module generates said symmetric encryption key, said device encrypting said symmetric encryption key using a public key of said server, wherein said encrypted symmetric encryption key is transmitted to said server, wherein said server receives said encrypted symmetric encryption key and asymmetrically decrypts said encrypted symmetric encryption key using a private key of said server to provide said symmetric key to said server;
    (b) said server generates said symmetric encryption key, said server encrypts said symmetric encryption key using a public key of said device, said device receives said encrypted symmetric encryption key from said server, said device uses a private key of said device to asymmetrically decrypt said encrypted symmetric encryption key to provide said symmetric key to said symmetric encryption module;
    (c) said device generates a large number of said symmetric encryption keys for use according to a schedule, said device and said server being coupled via a secure local connection for transferring said large number of symmetric encryption keys from said device to said server for use in producing said decrypted copy of said encrypted media according to said schedule; and
    (d) said server generates a large number of said symmetric encryption keys for use according to a schedule, said device and said server being coupled via a secure local connection for transferring said large number of symmetric encryption keys from said server to said device for use by said symmetric encryption module according to said schedule;
  authenticating, at the server, a user device to access the encrypted media, the server having secure access to the symmetric encryption key; and
  providing, by the server and to the user device, one of:
    an encrypted copy of the symmetric encryption key for decrypting said encrypted media; and
    either a decrypted copy of the encrypted media obtained from the device or a re-encrypted version of the decrypted copy, wherein said providing to the user comprises producing the decrypted copy of the encrypted media obtained from the device using the symmetric encryption key.

13. The method of claim 12, wherein said providing to the user device of the encrypted copy of the symmetric encryption key comprises encrypting the symmetric encryption key with an asymmetric encryption key.

14. The method of claim 12, comprising obtaining, at the server, a subsequent symmetric encryption key from the device, and wherein said providing, by the server and to the user device, the encrypted copy of the symmetric encryption key comprises providing an encrypted copy of the subsequent symmetric encryption key.

15. The method of claim 14, wherein said obtaining the subsequent symmetric encryption key comprises obtaining, at the server, an asymmetrically encrypted copy of the subsequent symmetric encryption key from the device, and decrypting the asymmetrically encrypted copy of the subsequent symmetric encryption key using private key associated with the server to obtain the subsequent symmetric encryption key.

16. The method of claim 14, comprising, responsive to said obtaining the subsequent symmetric encryption key, updating a log maintained by the server with the symmetric encryption key.

17. A method for collecting and handling media for use as evidence in legal proceedings, the method comprising:
  deploying recording devices each having a recording unit and a symmetric encryption module able to generate random symmetric encryption keys and to encrypt original, unencrypted media using one of said random symmetric encryption keys;
  obtaining, at a server, encrypted media from the devices, the encrypted media based on the unencrypted media and produced by a symmetric encryption module of the device using a symmetric encryption key;
  wherein said symmetric encryption module of the device and said server obtain said symmetric encryption key by one of:
    (a) said symmetric encryption module generates said symmetric encryption key, said device encrypting said symmetric encryption key using a public key of said server, wherein said encrypted symmetric encryption key is transmitted to said server, wherein said server receives said encrypted symmetric encryption key and asymmetrically decrypts said encrypted symmetric encryption key using a private key of said server to provide said symmetric key to said server;

(b) said server generates said symmetric encryption key, said server encrypts said symmetric encryption key using a public key of said device, said device receives said encrypted symmetric encryption key from said server, said device uses a private key of said device to asymmetrically decrypt said encrypted symmetric encryption key to provide said symmetric key to said symmetric encryption module;

(c) said device generates a large number of said symmetric encryption keys for use according to a schedule, said device and said server being coupled via a secure local connection for transferring said large number of symmetric encryption keys from said device to said server for use in producing said decrypted copy of said encrypted media according to said schedule; and (d) said server generates a large number of said symmetric encryption keys for use according to a schedule, said device and said server being coupled via a secure local connection for transferring said large number of symmetric encryption keys from said server to said device for use by said symmetric encryption module according to said schedule;

authenticating, at the server, a user device to access the encrypted media, the server having secure access to the symmetric encryption key; and providing, by the server and to the user device, one of:
  an encrypted copy of the symmetric encryption key for decrypting said encrypted media; and
  either a decrypted copy of the encrypted media obtained from the device or a re-encrypted version of the decrypted copy, wherein said providing to the user comprises producing the decrypted copy of the encrypted media obtained from the device using the symmetric encryption key.

18. The method of claim 17, wherein said providing to the user device of the encrypted copy of the symmetric encryption key comprises encrypting the symmetric encryption key with an asymmetric encryption key.

19. The method of claim 17, comprising obtaining, at the server, a subsequent symmetric encryption key from the device, and wherein said providing, by the server and to the user device, the encrypted copy of the symmetric encryption key comprises providing an encrypted copy of the subsequent symmetric encryption key.

20. The method of claim 19, wherein said obtaining the subsequent symmetric encryption key comprises obtaining, at the server, an asymmetrically encrypted copy of the subsequent symmetric encryption key from the device, and decrypting the asymmetrically encrypted copy of the subsequent symmetric encryption key using private key associated with the server to obtain the subsequent symmetric encryption key.

21. The method of claim 19, comprising, responsive to said obtaining the subsequent symmetric encryption key, updating a log maintained by the server with the symmetric encryption key.

* * * * *